United States Patent
Shimomura et al.

(10) Patent No.: US 6,526,580 B2
(45) Date of Patent: *Feb. 25, 2003

(54) BROADBAND DATA BROADCASTING SERVICE

(75) Inventors: Tsutomu Shimomura, Incline Village, NV (US); Steve Waltman, Boulder, CO (US); Mark Peting, Tigard, OR (US); Castor Fu, Menlo Park, CA (US); Dag H. Johansen, Palo Alto, CA (US); Geoff Mulligan, Co Springs, CO (US)

(73) Assignee: Digeo, Inc., Kirkland, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/293,594

(22) Filed: Apr. 16, 1999

(65) Prior Publication Data

US 2002/0056100 A1 May 9, 2002

(51) Int. Cl.⁷ ............................. H04N 7/20; H04N 7/173
(52) U.S. Cl. ............................. 725/63; 725/73; 725/81; 725/110; 725/123
(58) Field of Search .................................. 709/217, 218, 709/219; 455/3.2, 5.1, 6.3; 348/6, 7, 8, 10, 12, 13; 370/465; 725/73, 81, 85, 105, 110, 115, 116–118, 123, 63

(56) References Cited

U.S. PATENT DOCUMENTS

| | | | | |
|---|---|---|---|---|
| 5,508,733 A | * | 4/1996 | Kassatly | 348/13 |
| 5,600,633 A | * | 2/1997 | Jaisingh et al. | 370/277 |
| 5,636,211 A | * | 6/1997 | Newlin et al. | 370/465 |
| 5,701,580 A | * | 12/1997 | Yamane et al. | 455/3.1 |
| 5,708,960 A | * | 1/1998 | Kamisaka et al. | 455/3.2 |
| 5,737,107 A | * | 4/1998 | Umeda | 359/146 |
| 5,793,413 A | * | 8/1998 | Hylton et al. | 348/12 |
| 5,915,094 A | * | 6/1999 | Kouloheris et al. | 395/200.49 |
| 5,922,047 A | * | 7/1999 | Newlin et al. | 709/217 |
| 5,926,624 A | * | 7/1999 | Katz et al. | 395/200.47 |
| 5,974,496 A | * | 10/1999 | Miller | |
| 5,987,518 A | * | 11/1999 | Gotwald | 709/230 |
| 6,021,419 A | * | 2/2000 | Clarke, Jr. et al. | 708/300 |
| 6,064,796 A | * | 5/2000 | Nakamura et al. | |
| 6,172,673 B1 | * | 1/2001 | Lehtinen et al. | 345/327 |
| 6,408,128 B1 | * | 6/2002 | Abecassis | |

* cited by examiner

Primary Examiner—Bhavesh Mehta
Assistant Examiner—Kieu-Oanh Bui
(74) Attorney, Agent, or Firm—Blakely, Sokoloff, Taylor & Zafman

(57) ABSTRACT

A broadband data broadcast system that allows rich multimedia content to be delivered to a plurality of subscribers is disclosed. The broadband data broadcast system operates by multiplexing a plurality of rich multimedia digital information streams together at a centralized data broadcast center. The data broadcast center then broadcasts the multiplexed digital information stream on a broadcast medium such as satellite broadcasts, radio frequency broadcasts, or digital television broadcasts. A large number of receiver systems receive the broadcast signal and demodulate the broadcast signal to retrieve the multiplexed digital stream. The receiver system extracts a subset of digital information streams that the particular receiver system's owner has designated are of interest. The receiver system caches the interesting digital information stream for later access. The receiver system outputs the interesting digital information streams to a client system upon demand. The receiver system may also stream an incoming digital information stream to a client as the stream is received.

20 Claims, 13 Drawing Sheets

```
Personal News On-Demand

Search Result Headlines
•AOL and Geocast form joint venture
•Geocast celebrates 2 million customers       Geocast and AOL form joint Venture -
•AOL and Geocast talks rumored                (Mountain View, California) - Geocast and
•No Geocast comment on AOL talks              on-line giant America Online (AOL)
•Wireless fulfills broadband promises         announced a joint venture to distribute rich
•Geocast stock hits new high                  multimedia information to AOL's customers
                                              using Geocast's Geobox wireless broadband
Possible Related Headlines                    data broadcasting service. The joint venture
•AOL joins DOW Index                          will allow AOL customers to enjoy rich
•Pointcast generates new strategy             multimedia content delivered without the
•Digital Television sales soar                delays associated with traditional computer
•E! to generate data broadcast content        networks. Yada yada yada yada yada . . .

Internet Headlines
•AOL and Geocast joint venture announced  ⏵  AOL/Geocast Announcement
•Geocast hits 2 million customer mark
•Rumor: AOL and Geocast?
•Geocast stock soars in tech stock rally Local Information           Search:
        News Weather Traffic Sports Entertainment
```

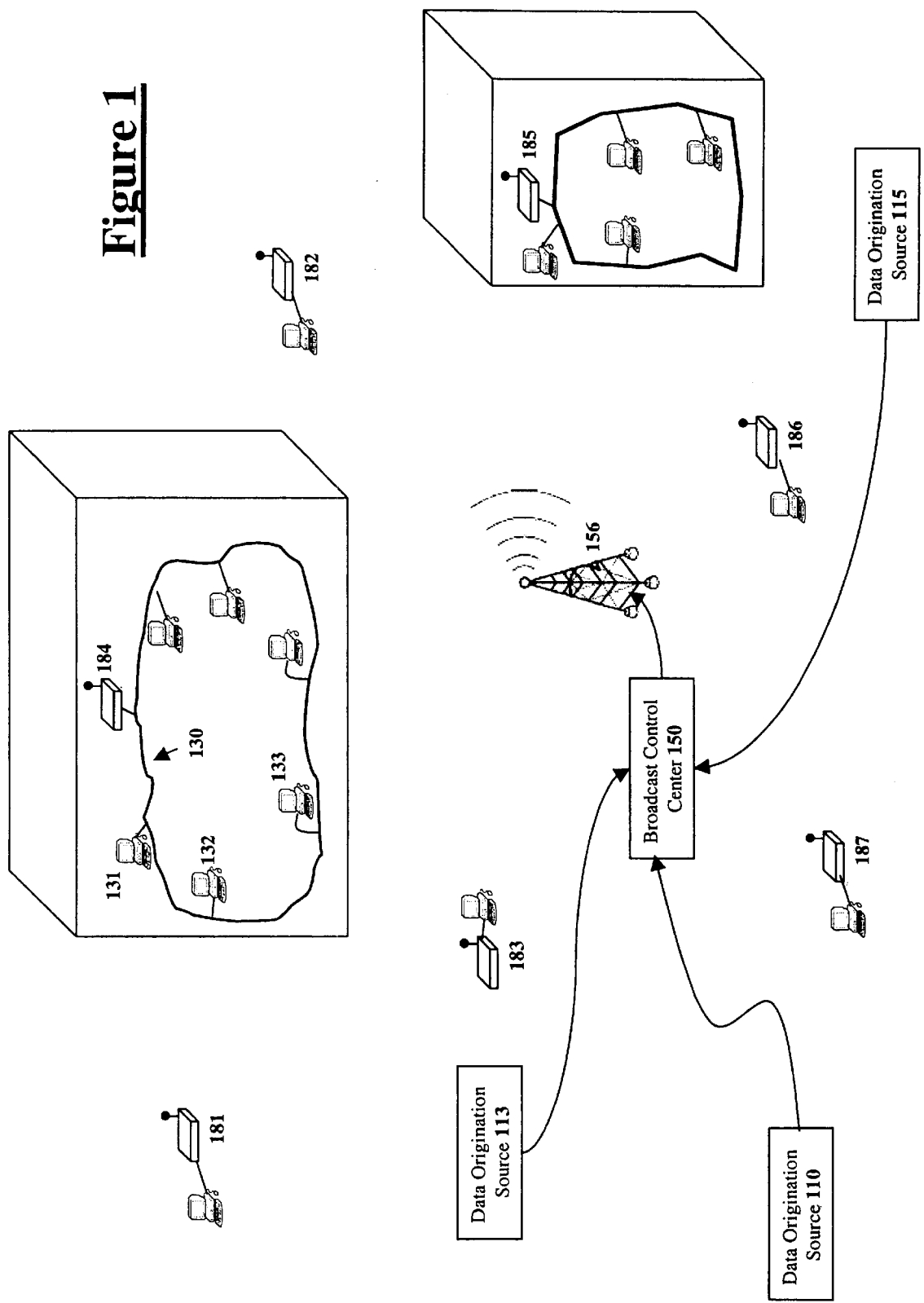

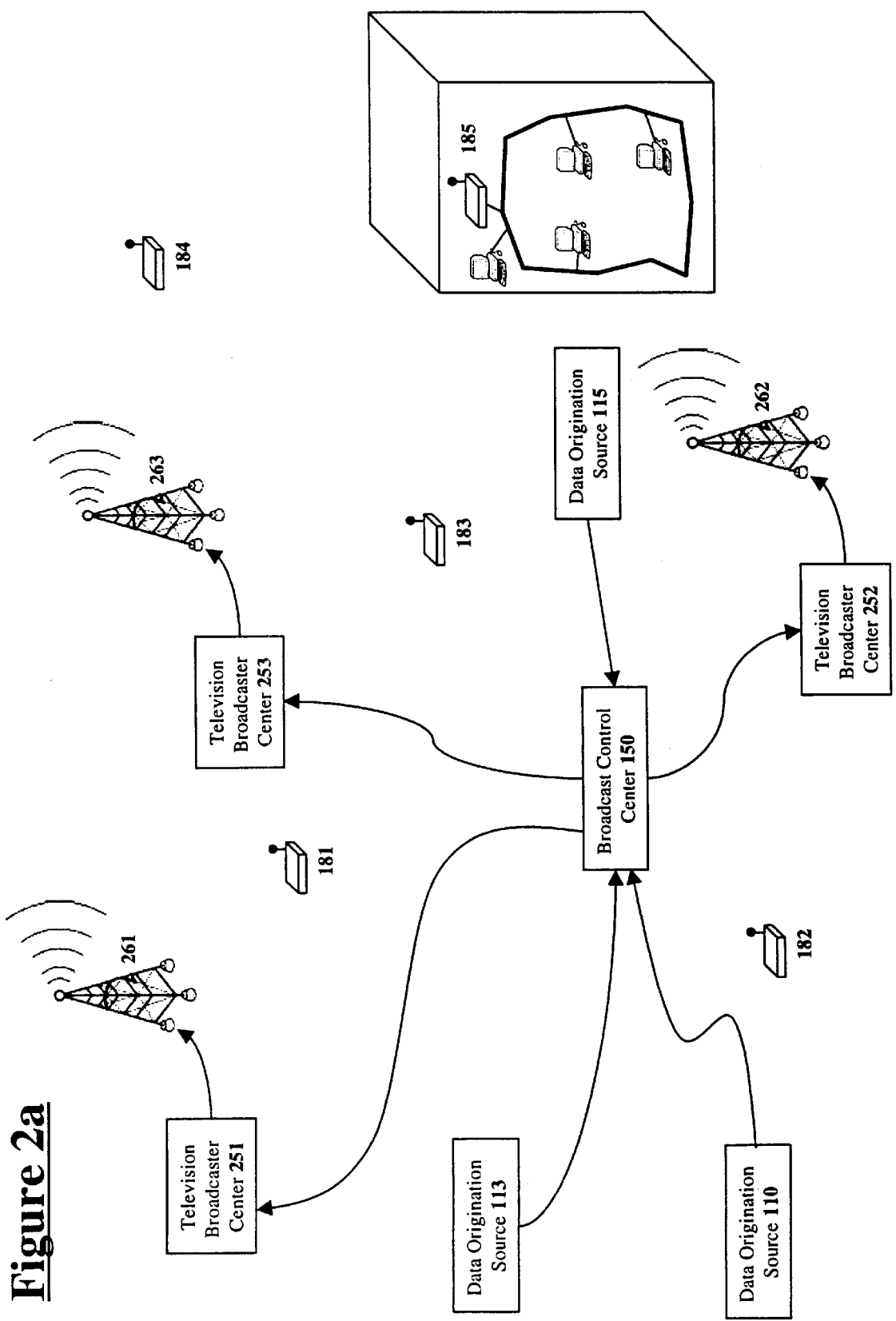

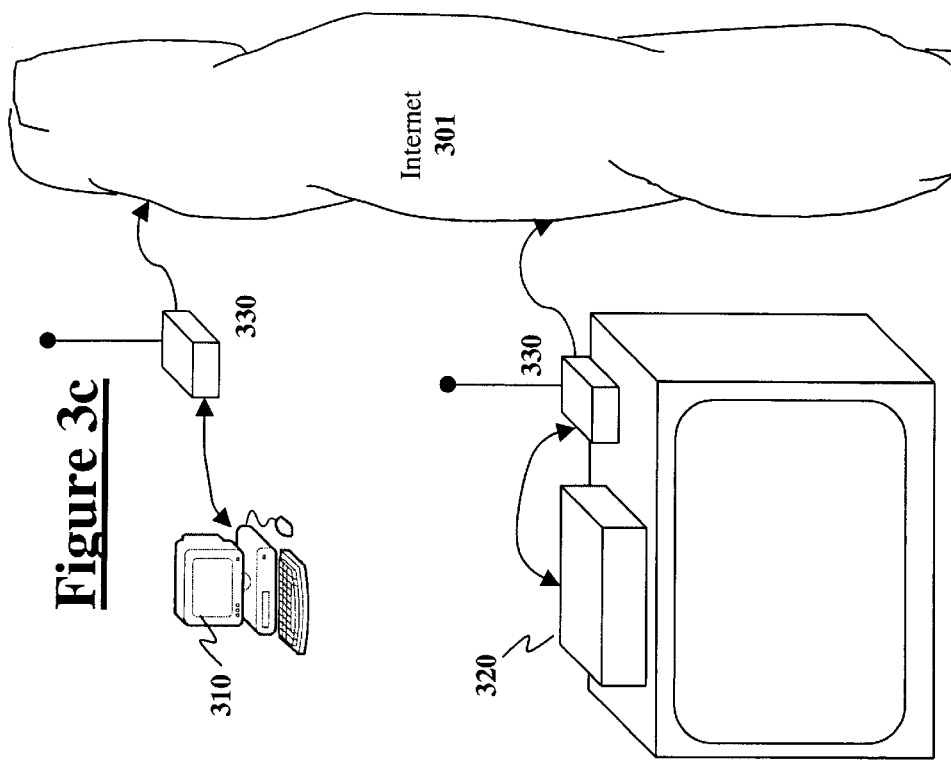
Figure 3c     Figure 3d
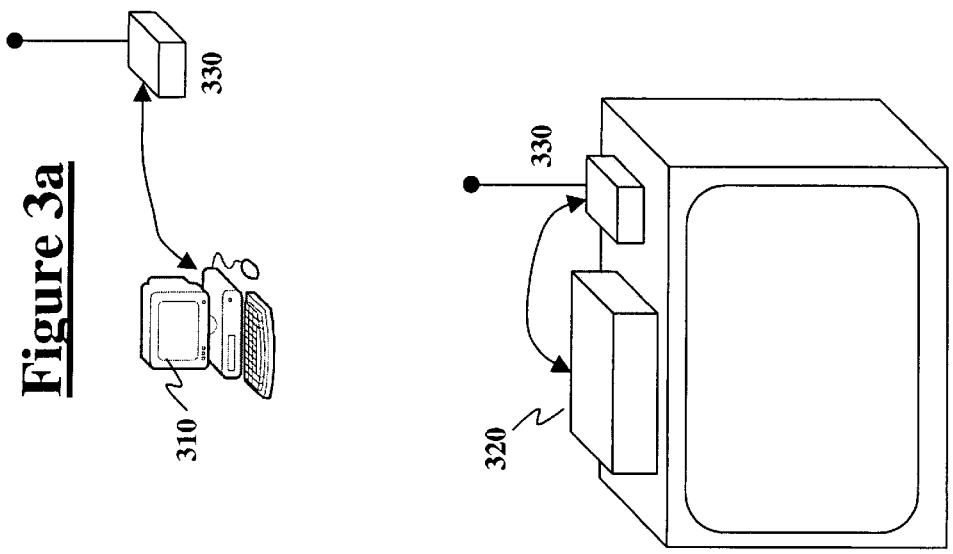
Figure 3a     Figure 3b

Top Sports Headlines    Personal News On-Demand
- MN Vikings win Superbowl!
- NJ Devils trade star wing
- 2008 Olympics in Beijing
- Michael Jordan Coaches Lakers
- Mexico team joins MLB

NFL Headlines
- MN Vikings defeat 49ers
- Cunningham surprises critics
- MN fans celebrate 1st victory
- 49er fans stunned by loss

NBA Headlines
- Michael Jordan Coaches Lakers
- NJ Nets defeat Celtics
- Utah Jazz star Smith arrested
- Clippers to leave LA

NHL Headlines
- NJ Devils trade star wing
- Oilers defeat Blackhawks

NJ Devils trade star wing LeDue to LA
Fullscreen

Other Sports Headlines
- 2008 Olympics in Beijing
- Michael Jordan Coaches Lakers
- Mexico team joins MLB
- Tennis Legend Passes away at 80
- AL debates designated hitter rule Search: Geocast Local Information
News Weather Traffic Sports Entertainment

Figure 10

Personal News On-Demand

Search Result Headlines
- AOL and Geocast form joint venture
- Geocast celebrates 2 million customers
- AOL and Geocast talks rumored
- No Geocast comment on AOL talks
- Wireless fulfills broadband promises
- Geocast stock hits new high

Possible Related Headlines
- AOL joins DOW Index
- Pointcast generates new strategy
- Digital Television sales soar
- E! to generate data broadcast content

Internet Headlines
- AOL and Geocast joint venture announced
- Geocast hits 2 million customer mark
- Rumor: AOL and Geocast?
- Geocast stock soars in tech stock rally

Geocast and AOL form joint Venture - (Mountain View, California) - Geocast and on-line giant America Online (AOL) announced a joint venture to distribute rich multimedia information to AOL's customers using Geocast's Geobox wireless broadband data broadcasting service. The joint venture will allow AOL customers to enjoy rich multimedia content delivered without the delays associated with traditional computer networks. Yada yada yada yada yada . . .

<u>AOL/Geocast Announcement</u>

Search: _____

<u>Local Information</u>
<u>News</u> <u>Weather</u> <u>Traffic</u> <u>Sports</u> <u>Entertainment</u>

Figure 11

BROADBAND DATA BROADCASTING SERVICE

RELATED APPLICATIONS

This patent application is related to a patent application entitled "Method and Apparatus for Broadcasting Data With Access Control" having Ser. No. 09/293,079 filed on Apr. 16, 1999.

FIELD OF THE INVENTION

The present invention relates to the field of digital communications. In particular the present invention discloses a broadband digital broadcast system for broadcasting digital information to a very large number of subscribers.

BACKGROUND OF THE INVENTION

The Internet has become a major source of news and information for very large numbers of people. In particular, millions of Internet users browse the World Wide Web (WWW) to obtain HyperText Markup Language (HTML) documents using the HyperText Transport Protocol (HTTP). Many people now receive more news and information from the Internet WWW sites than from traditional information sources such as television. The WWW portion of the Internet is an excellent medium for news and information since the WWW Internet sites can provide information to users on-demand. Specifically, Internet users can immediately request the exact information they are interested in when ever they wish from WWW Internet sites.

However, the Internet WWW system news information does suffer from a number of deficiencies. One serious problem is that the limited bandwidth of most Internet connections severely limits the amount of information delivered. Most Internet users access the Internet through a dial-up modem at speeds of 56 kps per second or less. With such limited bandwidth, most Internet based WWW sites only deliver text and static images. When video information is delivered through 56K Internet connections, the video information is compressed so heavily that only small low-resolution video images are delivered at a low frame rate.

To improve upon the performance of the Internet, many telecommunication providers are now offering high-bandwidth connections for the "last mile" to an Internet user's residence. Cable television providers are now offering cable modem Internet service that use cable television wiring to deliver broadband Internet service. Similarly, telephone companies are rolling out Digital Subscriber Line (DSL) services that provide broadband Internet service. Although these broadband data connections provide additional bandwidth, such broadband connections only address the "last mile" bandwidth problem associated with sending rich multi-media information across the internet. Many other problems will continue to exist.

One problem of delivering rich multi-media information across the Internet is that there are no standard quality-of-service guarantees for Internet Protocol data traffic. All Internet Protocol traffic is delivered on a best effort basis such that Internet Protocol packets are often dropped. Due the rapid uncontrolled growth of the Internet, many severe Internet "traffic jams" have occurred at large Internet peering point such as MAE-East and MAE-west. Thus, even if a user has a broadband connection between his residence and his Internet Service Provider (ISP), there is no guarantee that the connection between the Internet Service Provider (ISP) and a desired Internet media server will provide the bandwidth necessary for a rich multimedia stream.

Another problem with attempting to deliver rich multimedia information across the Internet is the point-to-point nature of Internet communication. Most Internet communication occurs in a unicast manner wherein a unique communication connection is established between each information server and each Internet client. Since each Internet client requires its own connection, the bandwidth requirement for serving information grows proportionally with the number of Internet clients being served. Furthermore, each Internet client that requests service adds additional load to the server systems that serve information. To serve rich multimedia information to a large number of a client systems, a large powerful server farm is required. It is therefore quite expensive.from the server end in both communication costs and computer costs to serve large amounts of rich multi-media information.

Due to the above-described problems associated with Internet delivery of multimedia information, the Internet will largely remain a text and static image based information source. It would be desirable to provide a multimedia rich information system that is similar to the Internet in terms of on-demand access of interesting information but without the bandwidth problems associated with the Internet network system.

SUMMARY OF THE INVENTION

The present invention discloses a broadband data broadcast system that allows rich multimedia content to be delivered to the computer and information appliance systems of limitless numbers of subscribers. The broadband data broadcast system operates by multiplexing a plurality of multimedia rich digital information streams together at a centralized data broadcast center. The data broadcast center then broadcasts the multiplexed digital information stream on broadcast media such as satellite broadcasts, radio frequency broadcasts, or television broadcasts. A large number of receiver systems receive the broadcast signal and demodulate the broadcast signal to retrieve the multiplexed digital stream. The receiver system extracts a subset of digital information streams that the particular receiver system's owner has designated are of interest. The receiver system may then output the interesting digital information streams to a display system or caches the interesting digital information stream for later access.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art, in view of the following detailed description in which:

FIG. 1 illustrates an overview of a terrestrial data broadcast system.

FIG. 2a illustrates an overview of a multiple broadcaster based terrestrial data broadcast system.

FIG. 3a illustrates a multimedia receiver/server system coupled to a personal computer system.

FIG. 3b illustrates a multimedia receiver/server system coupled to a television set-top box system.

FIG. 3c illustrates a multimedia receiver/server system coupled to a personal computer system that is also coupled to the Internet.

FIG. 3d illustrates a multimedia receiver/server system coupled to a television set-top box system that is also coupled to the Internet.

FIG. 10 illustrates a second possible screen display generated by and served from a multimedia web page served by a multimedia receiver/server system.

FIG. 11 illustrates a third possible screen display generated by and served from a multimedia web page served by a multimedia receiver/server system.

DETAILED DESCRIPTION OF THE PREFERRED EMBODIMENT

Figure 2B:
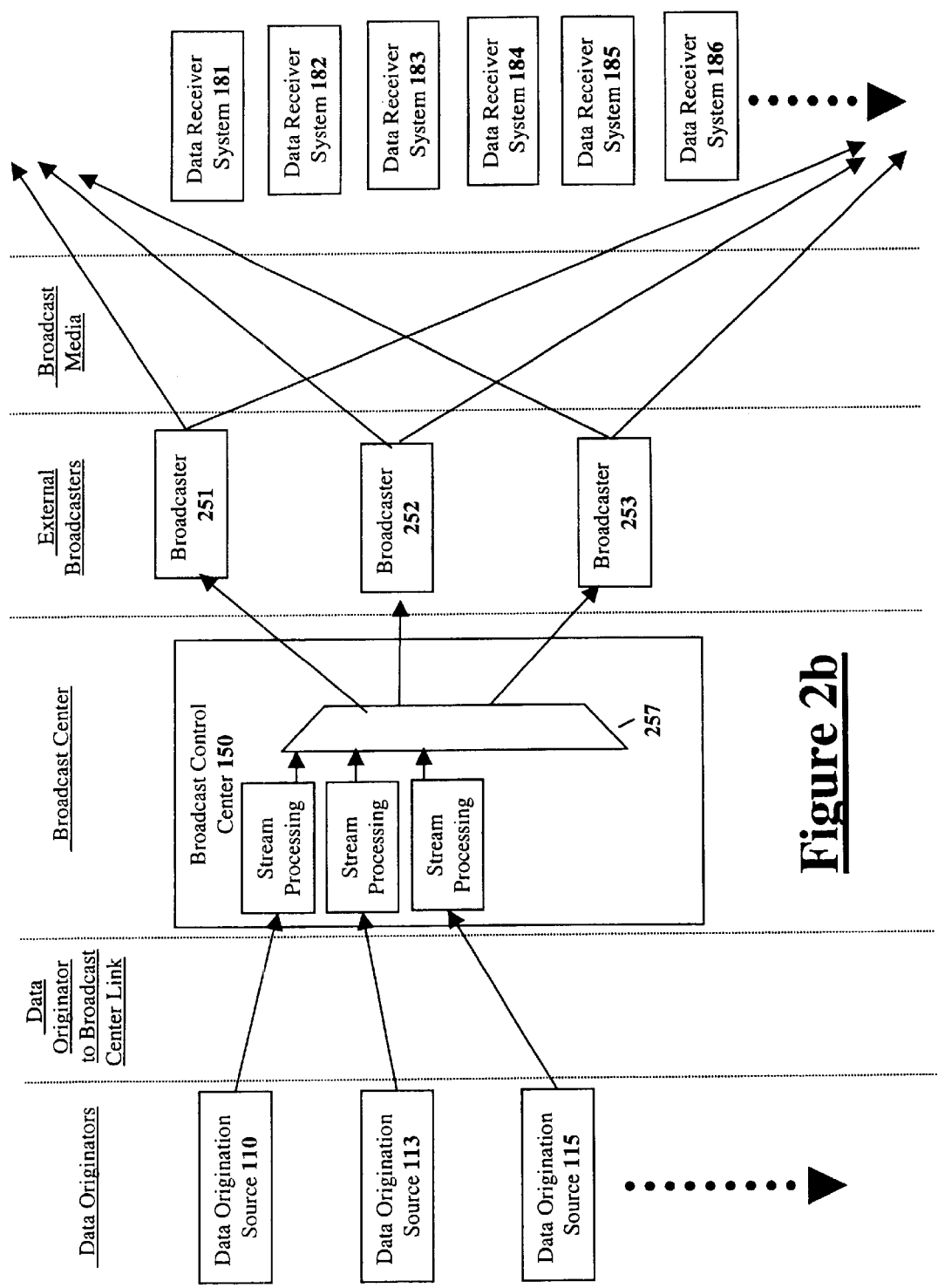
FIG. 2b illustrates a block diagram of a multiple broadcaster based terrestrial data broadcast system.

A method and apparatus for a directed data broadcast system is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to Internet multicasting. However, the same techniques can easily be applied to other types of data communication protocols.

Overview of a Data Broadcast System

FIG. 1 illustrates an overview of one embodiment of a data broadcast system that may incorporate the teachings of the present invention. Referring to FIG. 1, a data broadcast control center 150 receives digital information from a number of different data origination sources 110, 113, and 115.

For example, a first data origination source 110 transmits a digital information stream to a data broadcast facility 150 along a data communication channel 130. The data origination source 110 may be any entity that provides digital information for broadcast data over a data broadcast medium. One type of entity that may provide digital information for broadcast data over a data broadcast medium may be a broadcast news studio that creates audio and/or video news segments. The audio and/or video news segments may be digitized before or after transmission to the broadcast facility 150.

The broadcast control center 150 processes the incoming digital information stream from data origination source 110 by adding addressing information, stream descriptor information, and error correction coding. Other stream processing operations may be performed such as encryption of the information streams. The broadcast control center 150 then multiplexes the received digital information stream from data origination source 110 with digital information streams from other sources such as data origination source 113 and data origination source 115.

After processing the individual digital information streams and multiplexing the individual digital information streams into a single broadcast stream, the broadcast facility 150 then modulates the multiplexed digital information stream onto a digital broadcast signal. The broadcast control center 150 then transmits the digital broadcast signal on a broadcast distribution medium. In the particular embodiment illustrated in FIG. 1, a terrestrial wireless broadcast system is used to broadcast the digital broadcast signal to a large number of receiving sites. However, it should noted that many types of broadcast media can be used such as digital broadcast television signals, cable television signals, radio frequency broadcasts, direct video broadcast satellite signals, or any other suitable broadcast medium.

At each data broadcast receiver site is a data broadcast receiver system such as receiver 181 constructed to receive the digital broadcast signal. The receiver system 181 demodulates the digital broadcast signal to retrieve the multiplexed digital information stream. The receiver system 181 then examines the address portion of data packets and/or stream descriptor portions of each digital information stream to determine if the receiver system 181 is interested in a particular digital information stream. The receiver system 181 may be interested in a particular digital information stream if that digital information stream matches a set of preprogrammed interest parameters as defined by the receiver systems owner. The receiver system 181 may cache the matching digital information streams and/or directly output the matching digital information streams to one or more local client systems at the receiver system's site.

In one embodiment, the receiver system may distribute the output digital information streams in multicast Internet Protocol (IP) form on a local area network (LAN) if requested by any multicast subscribers on the LAN. For example, receiver system 184 receives and decodes the multiplexed broadcast signal. The receiver system 184 then rebroadcasts a subset of the received data onto an internal local area network (LAN) 130 such that the information stream is made available to client systems 131, 132, and 133. Furthermore, the receiver system 184 may cache the received digital information internally such that the information may be retrieved by the client systems at a later time.

Terrestrial Digital Television Data Broadcast Distribution

One broadcast medium that may be used to broadcast digital information is the terrestrial digital television infrastructure that is currently being built out. In a terrestrial digital television based transmission system, the processed multiplexed information stream is broadcast on a digital television transmission system using the MPEG-2 transport protocol.

The cost of building and maintaining a terrestrial digital television transmission system is very high. It would therefore be very expensive to build a terrestrial digital television transmission system just for data broadcasting. Instead, it would be desirable to share terrestrial digital television broadcast transmission capability with a terrestrial digital television broadcaster. Thus, the present invention introduces an embodiment that uses extra broadcast capacity on terrestrial digital television transmission systems to provide an inexpensive data broadcast transmission system. In a preferred embodiment, extra digital broadcast transmission capacity from more than one digital television broadcaster may be used to provide broadband data broadcasting.

FIG. 2a illustrates a data broadcasting embodiment wherein the data broadcast control center 150 delivers MPEG-2 transport protocol encoded information streams to one or more terrestrial digital television broadcast centers 251, 252, and 253. The terrestrial digital television broadcast centers (251, 252, and 253) merge the received MPEG-2 transport protocol encoded information streams into their ATSC (Advanced Television Standards Committee) digital television signals. The terrestrial digital television broadcast centers 251, 252, and 253 then broadcast the merged signal to all the receiver systems through their digital television transmission systems 261, 262, and 263. The receiver systems (181, 182, 183 . . . ) receive the ATSC digital television signals and extract the desired digital information streams from the MPEG-2 transport stream. In such a multi-broadcaster embodiment, each receiver system (181, 182, 183 . . . ) should have more than one receiver circuit such that multiple digital television broadcast centers (251, 252, and 253) can be monitored simultaneously.

FIG. 2b illustrates a block diagram of the embodiment in FIG. 1. As illustrated in the block diagram of FIG. 2b, a multiplexing unit 257 must multiplex all of the processed digital information streams into a number of outgoing digital information streams equal to the number of broadcast stations being used. For example, in the example embodiment of FIGS. 2a and 2b, the multiplexing unit 257 must distribute the outgoing digital information stream to the three digital television broadcast stations 251, 252, and 253.

The individual digital television broadcast stations 251, 252, and 253 multiplex the data broadcast information in with their local digital television signal. The individual digital television broadcast stations 251, 252, and 253 may also multiplex in additional locally generated data broadcast content. For example, digital television broadcast stations 251 may create additional data broadcast formatted content with local advertisers and local news teams. These local content digital information streams provide additional data broadcast content to the data broadcast digital information streams. All of the receiver systems (181, 182, 183 . . . ) will receive the data broadcast signals from all the participating television broadcaster stations (251, 252, and 253).

Additional detailed information on a data broadcasting infrastructure that can use the teachings of the present invention is available in the co-pending patent application entitled "Method and Apparatus for Broadcasting Data With Access Control" having Ser. No. 09/293,079 filed on Apr. 16, 1999 and hereby incorporated by reference.

Data Broadcast Receiver Systems

The receiver systems of the present invention receive data systems broadcast information and present that information to users of the receiver system. In one embodiment, the data broadcast receiver systems receive the data broadcast streams and present that information to other client systems that display the received digital information. Such an embodiment is referred to as a wireless multimedia receiver/server device since multimedia information is received over a wireless medium and served to other client systems.

FIG. 3a illustrates a first example usage of a wireless multimedia receiver/server device. In the embodiment of FIG. 3a, a personal computer system 310 is coupled directly to a wireless multimedia receiver/server device 330. A number of different interface ports on computer system 310 may be used for such a connection. For example, a parallel data port, a Small Computer System Interface (SCSI), an Ethernet interface (using a cross-over cable), a FireWire™ Bus (IEEE.1394), or a Universal Serial Bus (USB) interface may be used to couple computer system 310 to wireless multimedia receiver/server device 330. It is desirable to select the available computer interface having the highest data rate in order to efficiently deliver rich multimedia content from the multimedia receiver/server device 330 to the computer system 310.

The wireless multimedia receiver/server device is not limited to usage by personal computer systems. FIG. 3b illustrates an example usage wherein a television set-top box 320 is coupled to a wireless multimedia receiver/server device 330. The television set-top box 320 may operate using standard Internet data communication protocols such as HyperText Transport Protocol (HTTP).

The wireless multimedia receiver/server device 330 may be used alone as illustrated in FIGS. 3a and 3b or in conjunction with a wired network connection. FIGS. 3c and 3d illustrate an application of a wireless multimedia receiver/server device 330 wherein the wireless multimedia receiver/server device 330 acts as an intermediary for an Internet connection. In such an embodiment, the wireless multimedia receiver/server device 330 may act as a proxy server for the Internet. In such an arrangement, the wireless multimedia receiver/server device 330 may provide many additional services such as local domain name service (DNS), web page caching, and email service. In a web page caching wireless multimedia receiver/server device 330, the broadcast control center may broadcast versions of very popular web pages to the wireless multimedia receiver/server devices such that very popular web pages are immediately available.

Figure 4:
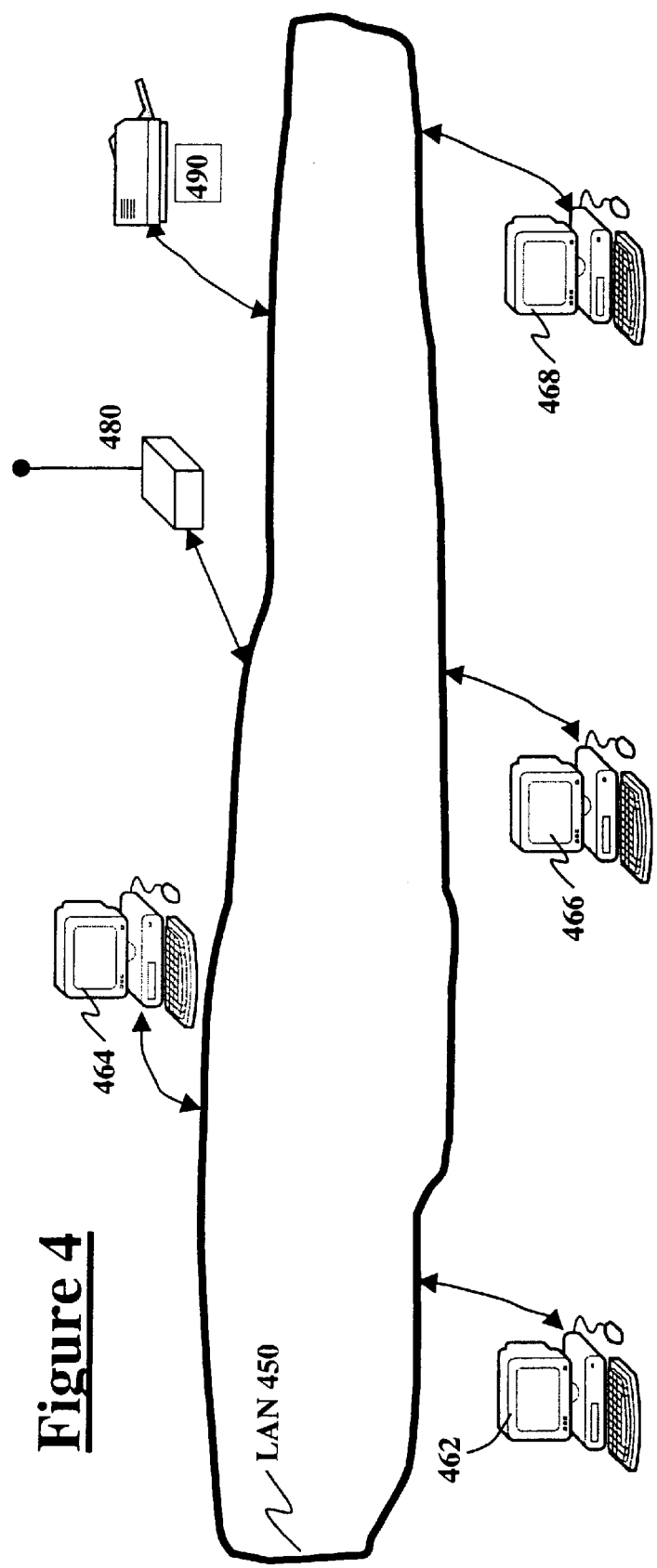
FIG. 4 illustrates an embodiment of a multimedia receiver/server system coupled to a computer network such that the multimedia receiver/server system serves multiple client systems.

The receiver systems can be used to provide service to multiple client systems at a receiver site. FIG. 4 illustrates a wireless multimedia receiver/server device 480 is coupled to a local area network (LAN) 450. The local area network (LAN) 450 may be constructed using standard Ethernet technology, Token Ring technology, homerun™ home LAN technology, or any other existing or newly created computer network technology. In a computer network based embodiment, the wireless multimedia receiver/server device 480 may serve several client systems coupled to the local area network (LAN) 450. For example, in FIG. 4 the multimedia receiver/server device 480 may serve multimedia information to client computer systems 462, 464, 466, and 468.

Data Broadcast Receiver/Server Hardware

Figure 5:
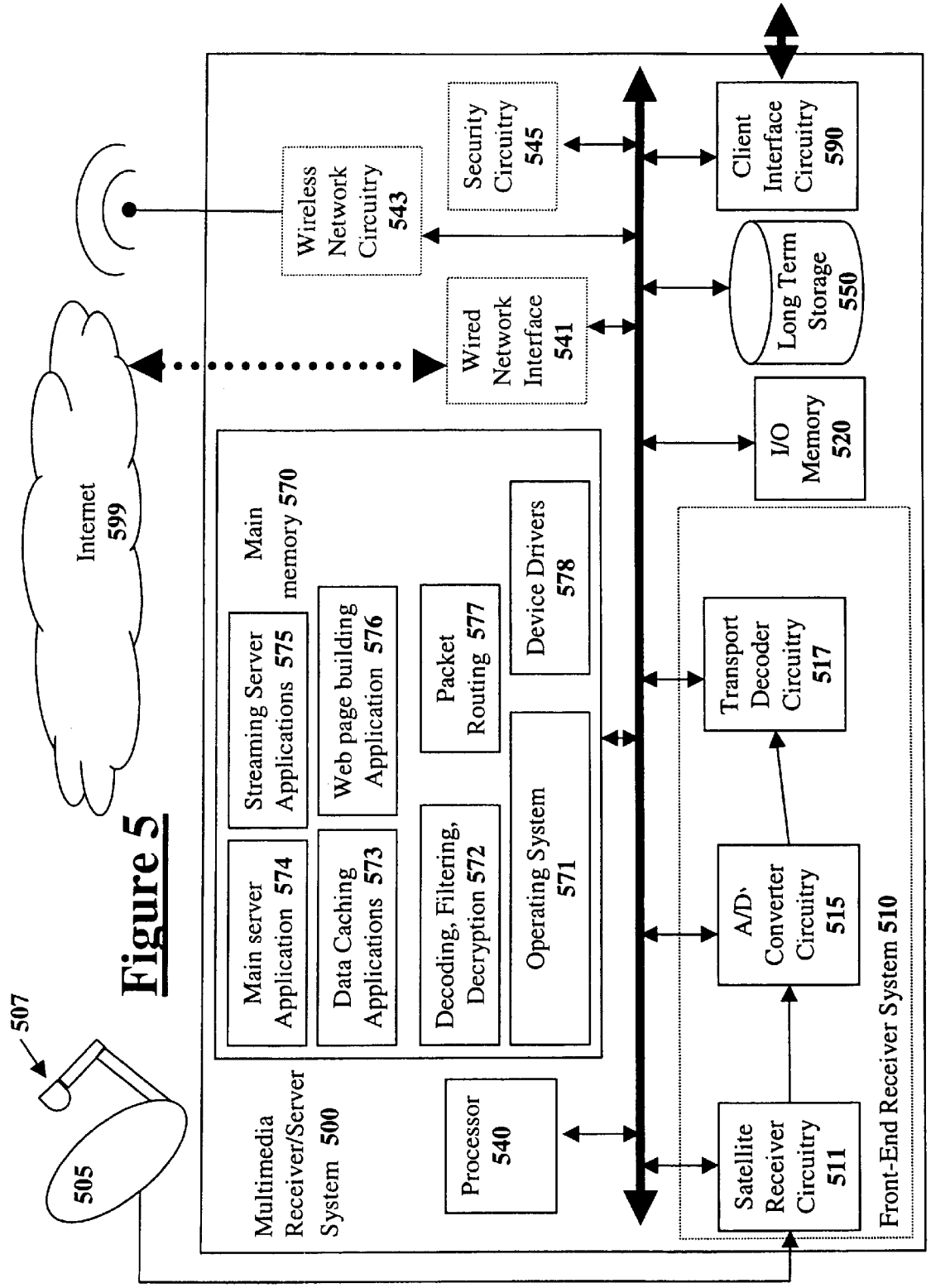
FIG. 5 illustrates an embodiment of a multimedia receiver/server system that receives a data broadcast from a direct video broadcast satellite.

FIG. 5 illustrates one embodiment of a multimedia receiver/server device 500. The multimedia receiver/server device 500 receives an encoded data stream through a receiver front-end receiver system 510. The receiver front-end system 510 includes a signal reception system 505 for receiving a digital broadcast signal and accompanying receiver circuitry for demodulating digital broadcast signal received on the signal reception system 505. The signal reception system 505 may be a Ku band satellite antenna, a terrestrial broadcast digital television antenna, a connection to a cable television based digital signal distribution system, or any other appropriate system for receiving broadcast signals.

A Digital Video Broadcast Satellite Based Receiver Front-End

The multimedia receiver/server device 500 of FIG. 5 illustrates a satellite based digital video broadcast based receiver front-end system 510. In the digital video Broadcast based receiver front-end system 510, the signal reception system 505 may comprise a Ku Band satellite antenna system.

The Ku Band satellite signal reception system 505 includes a low-noise block converter (LNB) 507 that delivers a frequency converted signal an appropriate satellite band receiver circuitry 511. The satellite receiver circuitry 511 filters and amplifies the frequency range of the desired satellite signal. The satellite receiver circuitry 511 multiplies the filtered signal using a local oscillator to recover an in-phase (I) and quadrature (Q) version of the broadcast signal.

The satellite receiver circuitry 511 passes the in-phase (I) and quadrature (Q) signals to an analog to digital (A/D) converter 515. The analog to digital (A/D) converter 515 digitizes the in-phase (I) and quadrature (Q) signals and passes the digitized signal information to transport decoder circuitry 517.

The transport decoder circuitry 517 recovers the transmitted digital bit stream from the digitized in-phase (I) and quadrature (Q) signals. In one Ku band direct video broadcast satellite embodiment, the transport decoder circuitry 517 may includes a demodulator integrated circuit such as the OTI-8511 integrated circuit from Oak Technology of Sunnyvale, Calif. In such a DVB satellite based system, the OTI-8511 integrated circuit demodulates the in-phase (I) and quadrature (Q) signals to recover an MPEG-2 transport stream. The MPEG-2 transport stream is defined by the ISO standard in the document ISO/IEC 13818-1 titled "Information technology—Generic coding of moving pictures and associated audio information: Systems." Control circuitry in the transport decoder circuitry 517 may copy the MPEG-2 transport stream into an I/O memory system 520.

A Terrestrial Digital Television Based Receiver Front-End

Figure 6A:
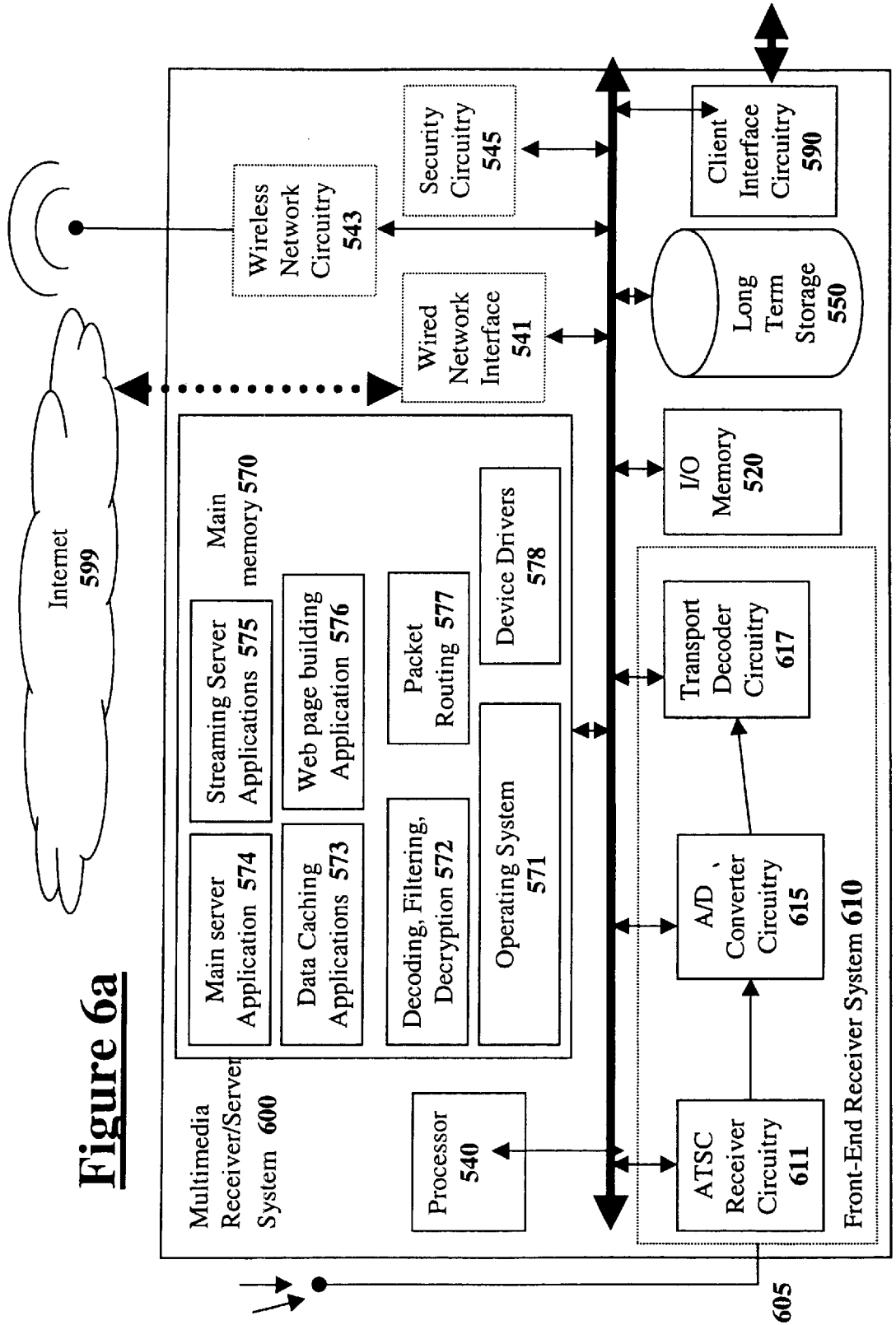
FIG. 6a illustrates an embodiment of a multimedia receiver/server system that receives a data broadcast on a digital television broadcaster signal.

FIG. 6*a* illustrates a multimedia receiver/server device 600 that has a different receiver front-end receiver system. Specifically, FIG. 6*a* illustrates a multimedia receiver/server device 600 with a terrestrial digital television based receiver front-end system 610. In particular, a terrestrial digital television based upon the American Television Standards Committee (ATSC) is illustrated. In the ATSC digital television based receiver front-end system 610, the signal reception system 605 comprises an antenna system suitable for receiving ATSC digital television signals.

The ATSC digital television signals are then processed by an ATSC digital television receiver circuit 611. As in the satellite embodiment of FIG. 5, the receiver circuit 611 is used to recover an MPEG-2 transport stream. The MPEG-2 transport stream is then decoded by transport decoder circuitry 617. Since the same transport coding is used as disclosed in the preceding receiver system, the same MPEG-2 transport stream decoder may be used to decode the signal to retrieve the MPEG-2 transport stream. The output MPEG-2 transport stream may then be placed into the I/O memory system 520.

As noted in the embodiments of FIG. 5 and FIG. 6*a*, multiple different types of receiver systems can be constructed that used different frontend receiver systems. In this manner, slightly modified receiver systems can be built for each target market in order to take advantage of the best broadcast medium for that market. Specifically, ATSC terrestrial digital television frontend receiver systems, direct video broadcast satellite front-end receiver systems, and digital cable television front-end receiver systems can be built for ATSC terrestrial digital television markets, direct video broadcast markets, and digital cable television markets, respectively. With those three different types receiver systems, the same MPEG-2 transport systems is always used such that the same MPEG-2 transport signal can be used for all the different types of markets.

A Multiple Tuner Terrestrial Digital Television Receiver Front-End

Figure 6B:
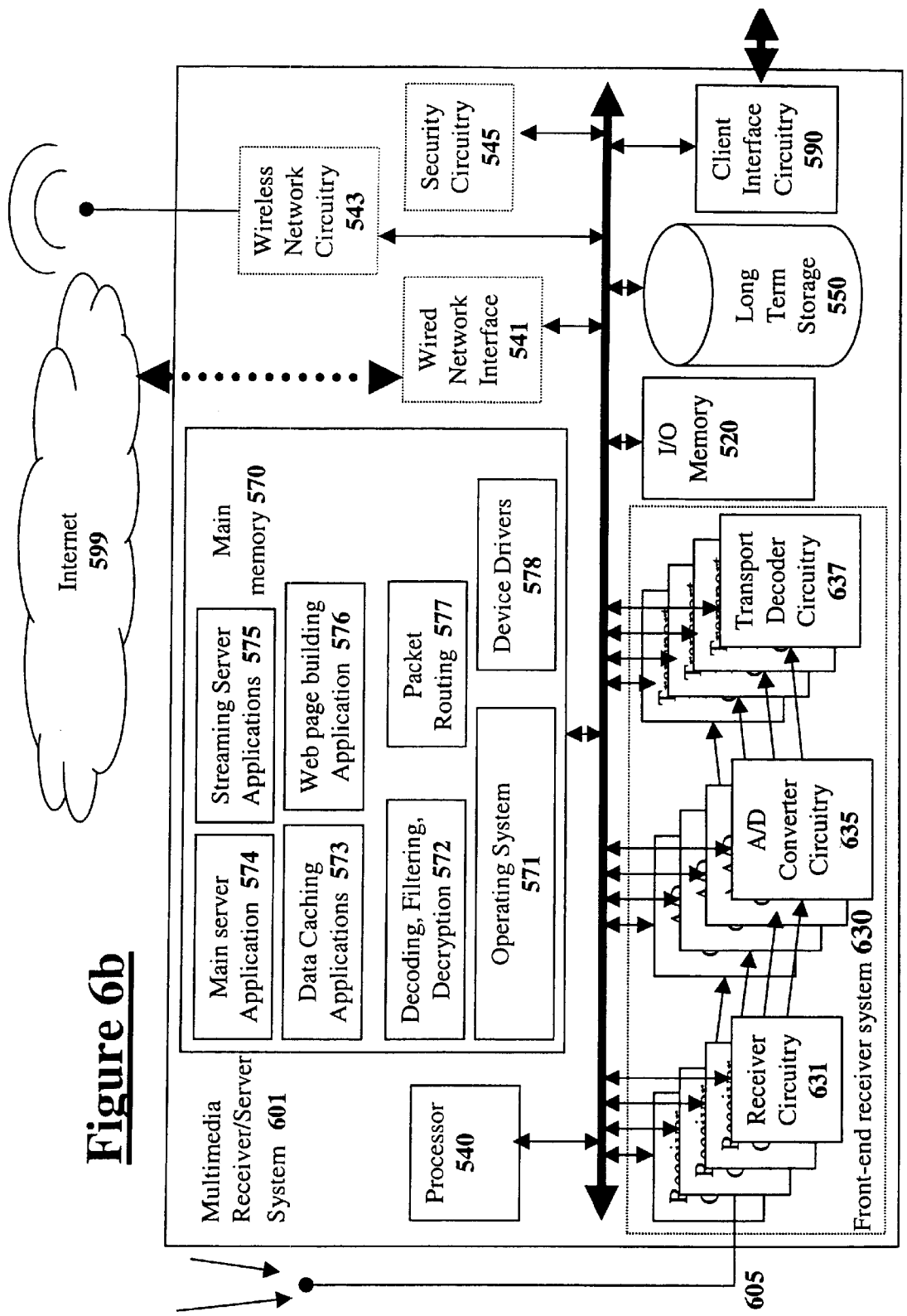
FIG. 6b illustrates a block diagram of a multimedia receiver/server system that receives data broadcasts from multiple digital television broadcasters.

As illustrated in FIG. 2*a*, it may be desirable to aggregate the extra broadcast bandwidth available from a number of digital television broadcasters within a particular terrestrial broadcast television market. With such an arrangement as depicted in FIG. 2*a*, the receiver systems should be able to receive all of the broadcast data signals. FIG. 6*b* illustrates a multimedia receiver/server device 600 that includes multiple instances of the receiver front-end receiver system. Specifically, FIG. 6*b* illustrates a multimedia receiver/server device 600 with multiple instances of the receiver circuitry 611, the Analog to Digital circuitry 615, and the transport decoder circuitry 617. In this manner, multiple data broadcasts from multiple digital television broadcasters (251, 252, and 253) can be simultaneously received. With such a multiple receiver configuration, the aggregated bandwidth may exceed multiple megabytes per second.

Receiver System Digital Information Stream Processing

Referring back to FIG. 5, once the multiplexed digital stream is copied into the I/O memory system 520, the processor 540 of the receiver/server 500 performs additional processing of the digital stream. The processor 540 is part of a typical computer system arrangement that includes memory (memory 570 and I/O memory 520), long term storage 550, input/output devices (590, 541, 543, etc.), and a central processing unit (processor 540).

The processor 540 operates under the control of programs in the main memory 570. To share the computing resources of the digital receiver system 500, the processor 540 executes an operating system 571. The operating system 571 provides standard operating system features such as input/output abstraction, multitask scheduling, and memory management. The operating system allows the application software to easily access and use the resources of the computer system. In one embodiment of the present invention, the operation system 571 comprises a version of the Berkeley Standard Distribution (BSD) of the UNIX operating system. However, other operating systems can be used.

Data Broadcast Receiver/Server Software

As illustrated in FIG. 5, the multimedia receiver/server 500 may execute several application programs concurrently under the control of an operating system 571 to provide data broadcasting services to a user. The software of one embodiment of a multimedia receiver/server system will be disclosed with reference to FIGS. 5 and 7. However, many different multimedia receiver/server software architectures may be created.

Figure 7:
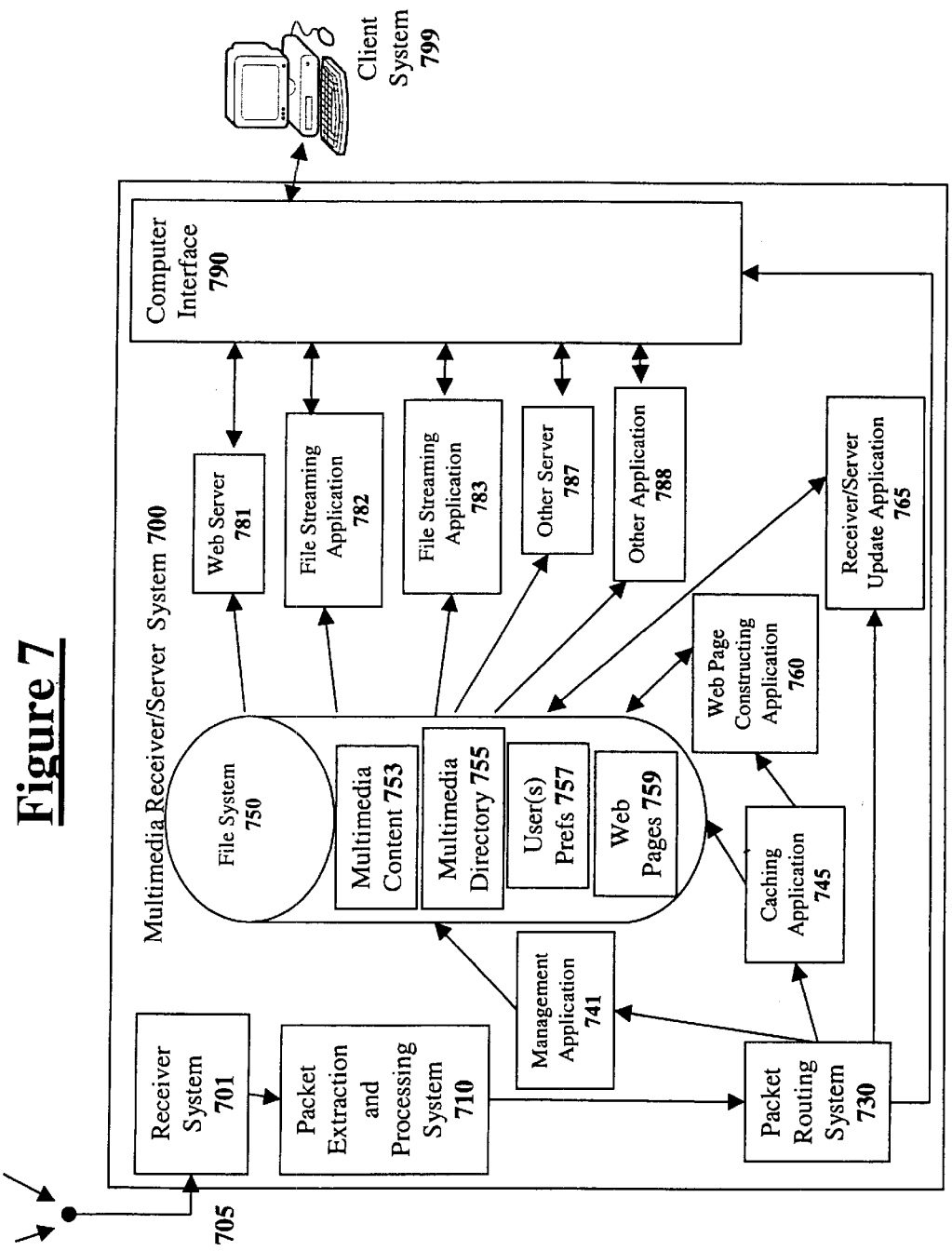
FIG. 7 illustrates a conceptual flow diagram of one possible software architecture for a multimedia receiver/server system.

Referring to FIG. 7, a conceptual software architecture diagram of a multimedia receiver/server 700 is illustrated. The software architecture has been designed to process data broadcast information received through a receiver system 701 and present that data broadcast information to a user at a client system 799. A first step that is performed is parsing of the incoming digital information stream.

Packet Extraction and Processing

Referring the conceptual diagram of FIG. 7, a packet extraction and processing system 710 examines the multiplexed digital information stream received by the receiver system 701. The packet extraction and processing system 710 extracts network packets that may be of interest to the multimedia receiver/server system 700. Specifically, the packet processing system 710 identifies and extracts packets that are specifically addressed to the multimedia receiver/server system 700 and packets that have specific defined characteristics. In a preferred embodiment, the data packets are Internet Protocol (IP) packets.

Referring back to FIG. 5, the packet processing is performed by one or more decoding, filtering, and decrypting applications 572. In one embodiment, these applications extract IP packets from MPEG-2 transport frames. The IP packet extraction may include such steps as forward error correction, decryption, and packet reassembly. Normally, not all of the packets in the multiplexed digital information stream will be extracted since many packets may be encrypted in a manner that cannot be decrypted by this unit, addressed to other entities, or otherwise inappropriate.

Packet Routing

Referring again to FIG. 7, the extracted packets are passed to a packet routing system 730. The packet routing system 730 routes the received packets appropriate destinations. For example, certain system update packets may be addressed for delivery to a receiver/server update application 765. The receiver/server update application 765 may thereby receive information that allows automatic software updates to be performed on the multimedia receiver/server system 700. Packets may also be routed to a management application 741 that manages the operation of the multimedia receiver/server system 700. For example, encryption keys that may be used to decrypt certain digital information streams may be delivered to the management application 741 such that the management application 741 may receive encryption keys and other control parameters.

The packet routing system 730 may route other data packets to one or more client systems coupled to the multimedia receiver/server system 700 through computer interface 790. Thus, it can be seen from FIG. 7 that the multimedia receiver/server system 700 may forward data packets received from the data broadcast signal directly to client systems coupled to the multimedia receiver/server system 700. In such operations, the multimedia receiver/server system 700 acts as a packet router to deliver packets broadcast over a broadcast medium. One very useful application for this particular feature is using the multimedia receiver/server system 700 as a multicast router that can deliver multicast packets to any client or network coupled to the multimedia receiver/server system 700. For example, a stock ticker stream may be broadcast as a live multicast IP stream such that a stock trading application on client system 799 may directly receive and use real-time stock trading information.

Referring to FIG. 5, the packet routing may be performed by a packet routing application 577. The routing application uses the services provided by the operating system 571 and device drivers 578 to deliver packets to the proper destinations.

Information Caching

As seen in the preceding section, the multimedia receiver/server system 700 can be used to immediately route packets received from the data broadcast signal. However, the multimedia receiver/server system 700 can also be used to provide very useful data services by locally caching information. Referring to FIG. 7, one or more caching applications 745 (data caching application 573 in FIG. 5) receives data packets from the packet routing system 730 and caches information from those packets into a file system 750.

In one embodiment, the caching application 745 may request to receive packets addressed to one or more designated multicast addresses that carries multimedia information and accompanying descriptors. The caching application 745 selectively captures multimedia information and stores that multimedia content information 753 in a file system 750. The caching application 745 may create multimedia information directory 755 such that the cached multimedia information may be quickly searched and accessed. The multimedia information may consist of anything that can be expressed in digital form including audio, video, text, web pages, and computer programs.

In one embodiment, each multimedia information stream is preceded by a multimedia descriptor. The multimedia descriptor describes the details of the upcoming multimedia stream. The caching application 745 can use the multimedia descriptor to determine if the upcoming multimedia stream should be cached or not. For example, in one embodiment the user defines a set of categories that the user finds interesting. These categories are stored in users preferences file 757. Then, the caching application 745 uses the multimedia descriptor information in conjunction with the set of user preferences 757 to select multimedia streams that contain news or information related to the defined set of user interests. The caching application 745 can use the multimedia descriptor to help build the multimedia directory 755.

The following list provides some of the information that may be provided in a multimedia descriptor:

Title: A title for the multimedia stream

Full Headline: A news headline that can be used to describe the multimedia stream in a web page.

Origination date/time: The time the stream was broadcast.

Suggested expiration: A suggested expiration time for the stream. A multimedia receiver/server may use the expiration time to determine when the stream should be deleted from the multimedia content cache 753.

Source: A source of the multimedia stream (Reuters, CNN, Associated Press, United Press International, etc.)

Multimedia Stream Format: Information that describes the protocol and format of the multimedia information stream.

Accompanying multimedia stream(s): Other related multimedia streams.

SDP descriptor: A session description protocol (SDP) as defined by the IETF RFC 2327 for the multimedia stream.

Importance: A relative importance value assigned to the multimedia stream. The Importance value may be used when created user displays such that highly important stories are listed first.

Categorization code: A detailed categorization value that defines the subject matter of the multimedia stream. The categorization code may be hierarchical. For example, a multimedia video clip about the Minnesota Vikings winning the Superbowl may be categorized as Sports/NFL/MN_Vikings Ticker Symbols: If the multimedia story is related to one or more publicly traded corporations, the ticker symbols of those corporations should be listed here. This field can be used to identify stories about a public corporation when performing investment research.

Searching keywords: A set of keywords that are associated with the multimedia stream. The searching keywords can be used to locate relevant multimedia streams when searching the multimedia content.

News Item HTML: A preformatted web page that can be used to introduce or accompany a multimedia stream.

News Item Text: Text that describes the multimedia stream.

As can be seen from the multimedia descriptor description, the caching application 745 is provided with a large number of fields that can be used to select interesting multimedia streams. Additional fields may be used to provide additional information about the multimedia streams.

The caching application 745 may also handle cache clean up. Specifically, old and outdated information should be removed from the file system 750 to conserve resources. The caching application 745 may use a number of different methods of selecting information to remove. One simple method of performing cache clean up is to remove cached items after their suggested expiration time has elapsed.

Information Serving

The multimedia receiver/server system 700 may present the cached multimedia information in a number of different ways. However, one of the most popular current methods of presenting information is in the form of World Wide Web (WWW) pages formatted in HyperText Markup Language (HTML) or extensible Markup Language (XML). One embodiment of the multimedia receiver/server system 700 uses a web page constructing application 760 to create WWW pages 759 that may be presented to client systems. (The web page constructing application is listed as web page building applications 576 in FIG. 5.)

The web page constructing application 760 may continually examine the contents of the multimedia directory 755 and the multimedia content 753 to locate information to be incorporated into web pages. In one embodiment, the caching application 745 directly informs the web page constructing application 760 about the multimedia streams that will be cached. In this manner, the web page constructing application 760 can incorporate the newly cached information into the web pages. Furthermore, the web page constructing application 760 can incorporate "live" information that is currently being received by referring to a multicast stream that contains the live stream. Similarly, the caching application 745 should inform the web page constructing application 760 about multimedia information being removed from the file system 750 such that the web page constructing application 760 can remove references to deleted information.

The web page constructing application 760 should create web pages in accordance with the user's particular preferences. Specifically, the web page constructing application 760 refers to the user preferences file 757 to create a custom multimedia enhanced web page that specifically contains information according to the user's preferences. In a multiple client environment, the web page constructing application 760 may create a different customized web page for each user that uses the multimedia receiver/server system 700.

A web server application 781 serves the created web pages 759 to client systems that request the web pages 759. (The web server application is listed as main server application 574 on FIG. 5.) Due to the caching of rich multimedia information, the web server 781 may be aided by one or more file streaming applications 782 and 783. The file streaming applications 782 and 783 stream rich multimedia information such as videos and audio that may be incorporated into the customized web pages 759. Furthermore, the web pages may incorporate "live" streaming information that is delivered straight from the packet routing system 730. In this manner, video from live events can be incorporated directly into web pages.

Other methods of serving information besides using the World Wide Web protocols and formats may also be provided. For example, server 787 may provide raw file information to client systems the well-known Network File System (NFS). Server 787 could also be a File Transport Protocol (FTP) server. Other server applications that implement other protocols can also be implemented.

A Data Broadcast News Application

To illustrate one type of service that may be provided by the data broadcast system of the present invention, an example of a data broadcast news application is disclosed. Referring to FIG. 7, a user at a client system creates a set of preferences that describe the user's interests. The user preferences may be obtained by presenting a set of forms to the user with web server 781. The forms can be processed by Common Gateway Interface (CGI) scripts that store the user's preferences into user preferences file 757. For example, a user may specify that he is interested in top news stories, sports information, financial information, and science & technology information.

Using the user interests in the user preferences.file 757, the data caching application 745 begins collecting multimedia streams and multimedia descriptors broadcast over the data broadcast system. The caching application 745 creates a multimedia directory 755 using multimedia descriptor information. The caching application 745 may directly inform the web page constructing application 760 about the information streams that are being cached.

Figure 8:
FIG. 8 illustrates a first possible screen display from a multimedia web page served by a multimedia receiver/server system.

The web page constructing application 760 then uses the user preference information 757 along with multimedia descriptor information from the caching application 745 or from the multimedia directory 755 to create a customized multimedia enhanced web page for the user. FIG. 8 illustrates one possible example of a customized new web page created for the example user that is interested in top news stories, sports information, financial information, and science & technology information.

As depicted in FIG. 8, the, top news stories related to the user's interests are displayed in headline form. Furthermore, a multimedia video clip stream related to the most important news story within the user's interests is playing within a window of the web page display. The user can control the video clip using common VideoCassette Recorder (VCR) type controls such as play, stop, fast-forward, reverse, and mute. A video window as depicted in FIG. 8 may be implemented using a RealVideo viewer from RealNetworks of Seattle, Wash. or a NetShow viewer from Microsoft Corporation of Redmond, Wash. If the user is very interested in the story playing within the selected video clip, the user can expand the video to fill the full screen of the client system. The user may also retrieve other information related to the displayed video clip.

If the user is not interested in the video clip currently being displayed, the user can select one of the other headlines to bring up information on that story. The information may consist of a video clip, an audio clip, a web page, a text story, or any other digital information presentation.

Figure 9:
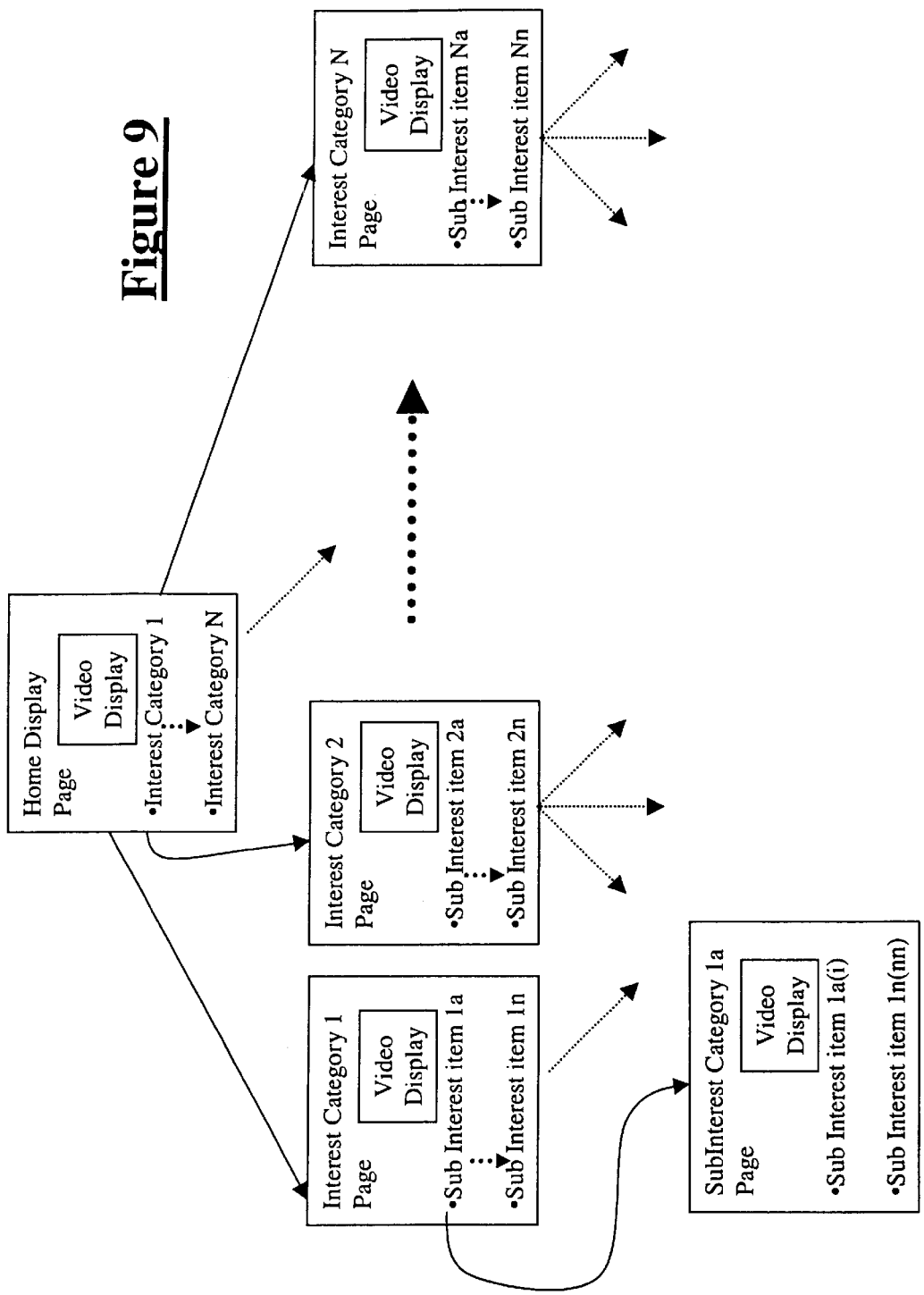
FIG. 9 illustrates a conceptual diagram of hierarchical multimedia information pages generated and stored by a multimedia receiver/server system.

The news web pages of the present invention can be created in typical hierarchical organization that is familiar to most computer users. FIG. 9 illustrates a conceptual diagram of a set of hierarchical web pages that have been created using the user's preferences and the available multimedia information. Thus, referring back to FIG. 8, if the user is not interested in the video clip currently being displayed or any of the current headlines, the user can select one of the different headline categories. The web server will then present a web page with specific category information.

In one embodiment, the user can select one of the headlines in a story to bring up a web page with additional stories in that category and detailed information about the selected story. For example, if the user selects the "NJ Devils trade Star Wing" headline the Sports news web page illustrated in FIG. 10 may be presented. As illustrated in FIG. 10, a video clip of the hockey player trade is displayed. Furthermore, the web page displays sports related news as a list of sports headlines. In the example of FIG. 10, the sports category sub-categories of NFL Headlines, NBA headlines, NHL headlines, and Other Sports Headlines are displayed.

Searching

The multimedia receiver/server system 700 can be used to provide custom web pages created in response to a user's query. For example, FIG. 10 illustrates a search term input box wherein a user may enter one or more search terms. More detailed searching can be performed by selecting the "search" prompt. As illustrated in FIG. 10, a user has requested a search to be performed using the term "Geocast." Referring back to FIG. 7, the web page construction application 760 uses the entered search term to search the multimedia directory 755. Furthermore, the web page construction application 760 may examine descriptor information for multimedia streams currently being received such that "live" content may be incorporated.

Using the located information that is related to the search terms, the web page construction application 760 dynamically creates a web page that may be presented to the user. FIG. 11 illustrates an example of a web page that may be created after searching the multimedia directory 755 with the search term "Geocast". As illustrated in FIG. 11, the dynamically generated web page contains a list of headlines from stories or multimedia streams related to the search term. The detailed information from most important story may be presented in a separate window as illustrated in FIG. 11. In this example, the multimedia information is a short text story with an accompanying audio stream of an official company announcement. Furthermore, the web page construction application 760 may include information from stories or multimedia information that may be related to the search terms.

In one embodiment wherein the multimedia receiver/server system 700 is coupled to the Internet, the web page construction application 760 may also include information retrieved from the Internet. Thus, the multimedia receiver/server system 700 can be used to merge multimedia information received over the data broadcast network with information retrieved from the Internet into a single display.

A Data Broadcasting Service

As disclosed, the present invention teaches methods and apparatus for implementing a broadband data broadcast system. The broadband data broadcast system allows rich multimedia information to be delivered to end-users that have narrowband or even no connection to the Internet. The broadband data broadcast system can be used to create a broadband data broadcast information service.

In one embodiment, the broadband data broadcast information service operates by selling multimedia receiver/server devices to consumers that desire service. The consumers connect their multimedia receiver/server devices to appropriate client systems such as personal computers, television set-top boxes, and home networks.

In one embodiment, a stand-alone multimedia receiver/display device may be sold such that users can use the service without having to have any other client system. Such an embodiment would be similar to the embodiment of FIG. 5 except that the client interface circuitry 590 would be replaced by a display device that is capable of displaying information and the software would include client software for displaying information on the display device.

The broadband data broadcast service could be subscription based, advertiser supported, or a combination of paid subscription content and advertiser supported content. In a preferred embodiment, a significant amount of information is broadcast without a subscription requirement but is accompanied by advertising multimedia information that is displayed concurrently or intermittently. For example, an advertisement window can be added to the screen displays of FIGS. 8, 10, and 11. Due to the broadband nature of the disclosed data broadcasting system, the advertisement window can include video and audio information. Thus, the broadband data broadcast system of the present invention permits advertisers to provide a rich multimedia message to users.

The advertisements can be accompanied by additional detailed information and programs stored locally on the file system 750. Thus, when a user is interested in a particular advertisement, the user can obtain that additional information or run programs associated with the advertisement. For example, an advertisement for a catalog based clothing merchant can be linked to a full version of the merchant's clothing catalog stored locally on the multimedia receiver/server device 700. Advertisers that desire to have large commercial documents such as product catalogs stored within the cache of the multimedia receiver/server systems could be charged a fee for such a privilege. The fee may be related to the amount of time that the commercial documents will be cached in the multimedia receiver/server device 700.

The user can browse the locally stored clothing catalog and select items for purchase. If the user has an Internet connection, the user can fill out an order form to order an item from the catalog. The broadband data broadcast capability of the present invention allows the catalog to include far more detailed information than normally presented on an Internet web page. Furthermore, the caching capability of the system allows all the catalog information to be stored locally for immediate and instantaneous access. Thus, it can be seen that the data broadcast service of the present invention provides the rich multimedia experience of radio and television along with the interactive browsing features of the Internet.

As depicted in FIGS. 3*a* and 3*b*, not all users of the multimedia receiver/server system of the present invention will have an Internet "back channel." Thus, a user without an Internet connection that browses a product catalog contained within the multimedia receiver/server system cannot initiate an Internet based ecommerce transaction. For such users, FIG. 5 illustrates one embodiment of the present invention that includes wireless network circuitry 543 for providing a wireless back channel. For example, a contract may be made with a cellular telephone provider to obtain access to the Short Messaging Service (SMS) portion of their cellular telephone network. The wireless network circuitry 543 may provide significant bandwidth to enable complex transactions such as online gaming, however the wireless network circuitry 543 need only provide:a narrowband connection for ecommerce applications such as purchase orders.

In addition to advertiser supported content, a number of subscription fee based premium services can be offered using the directed broadcast system of the present invention. For example, a special financial information subscription package may be offered that contains real-time stock quotes and in-depth financial news. Such subscription fee based premium data broadcast services would be protected by encrypting the digital information streams containing the premium content. To prevent piracy, the encryption system can be aided with the use of tamper-proof encryption circuitry 545 as depicted in FIG. 5. The tamper-proof encryption circuitry 545 contains private keys that cannot be accessed. Attempts to access the secret encryption keys within the encryption circuitry 545 will destroy the encryption circuitry 545. In one embodiment, the secure encryption module 870 comprises an iButton from Dallas Semiconductor of Dallas, Tex.

The foregoing has described a directed data broadcast system. It is contemplated that changes and modifications may be made by one of ordinary skill in the art, to the materials and arrangements of elements of the present invention without departing from the scope of the invention.

We claim:

1. A multimedia receiver apparatus, said apparatus comprising:

a first wireless receiver circuit, said first wireless receiver circuit demodulating a first wireless encoded digital multimedia signal having a first plurality of multimedia streams;

a second wireless receiver circuit, said second wireless receiver circuit demodulating a second wireless encoded digital multimedia signal having a second plurality of multimedia streams;

a processor, said processor controlling said first wireless receiver circuit and said second wireless receiver circuit, said processor selecting and extracting a subset of multimedia streams from said first plurality of multimedia streams and second plurality of multimedia streams;

a long term storage device, said processor for storing a subset of information from said subset of multimedia streams into a single unified cache on said long term storage device; and a computer interface, said computer interface for selectively outputting information from said subset of multimedia streams.

2. The apparatus of claim 1 wherein said first wireless encoded digital multimedia signal comprises a satellite broadcast signal.

3. The apparatus of claim 1 wherein said first wireless encoded digital multimedia signal comprises a terrestrial digital television broadcast signal.

4. The apparatus of claim 1 wherein each multimedia stream comprises Internet Protocol (IP) packets.

5. The apparatus of claim 1 wherein said first wireless encoded digital multimedia signal comprises MPEG-2 transport protocol.

6. The apparatus of claim 5 wherein each multimedia stream comprises Internet Protocol packets encapsulated within said MPEG-2 transport protocol.

7. The apparatus of claim 1 wherein said first wireless receiver circuit comprises a first ATSC digital television receiver circuit.

8. The apparatus of claim 7 wherein said second wireless receiver circuit also comprises a second ATSC digital television receiver circuit.

9. The apparatus of claim 1 wherein said first wireless receiver circuit comprises a direct video broad satellite receiver circuit.

10. The apparatus of claim 1 wherein said computer interface comprises a universal serial bus interface.

11. The apparatus of claim 1 wherein said processor executes a server program, said server program responding to requests received through said computer interface.

12. A method of distributing data, said method comprising:

broadcasting a first plurality of multimedia streams across a first broadcast medium;

broadcasting a second plurality of multimedia streams across a second broadcast medium;

receiving said first and second plurality of multimedia streams in a data broadcast receiver system, said data broadcast receiver system having a first receiver circuit and a second receiver circuit for receiving said first and second plurality of multimedia streams across said first and second broadcast medium respectively;

caching a subset of said first and second plurality of multimedia streams in a single unified cache in said data broadcast receiver system; and presenting a unified data service to a client system coupled to said data broadcast receiver system that comprises said subset of said first and second plurality of multimedia streams cached in said single unified cache on said data broadcast receiver system.

13. The method of distributing data as claimed in claim 12, said method further comprising:

receiving data information from a wired network into said data broadcast receiver system.

14. The method of distributing data as claimed in claim 12, wherein said wired network comprises the Internet.

15. The method of distributing data as claimed in claim 12, said method further comprising:

receiving in said data broadcast receiver system a query from said client system; searching said single unified cache for matching multimedia data that match said query from said client system; and presenting a query response from said data broadcast receiver system to said client system that comprises said matching multimedia data.

16. The method of claim 12, said method further comprising:

encrypting said first and second plurality of multimedia streams.

17. The method of claim 16, said method further comprising:

searching a server system coupled to said wired network for matching multimedia data information that matches said query.

18. A method of providing data to a client computer system from a data broadcast receiver, said method comprising:

receiving a first data broadcast stream from a first broadcast medium in said data broadcast receiver;

receiving a second data broadcast stream from a second broadcast medium while simultaneously receiving said first data broadcast stream in said data broadcast receiver;

caching data from said first and second data broadcast streams in a single unified cache in said data broadcast receiver system;

receiving information requests from said client computer system coupled to said data broadcast receiver system; and responding to said information requests by selectively providing information from said single unified cache in said data broadcast receiver system.

19. The method of claim 18, said method further comprising:

streaming digital information to said client computer system from said data broadcast receiver system through a computer interface.

20. The method of claim 18, said method further comprising:

deencrypting data from said first and second data broadcast streams.

* * * * *